(12) United States Patent
Shieh

(10) Patent No.: US 7,120,017 B2
(45) Date of Patent: Oct. 10, 2006

(54) HEAT DISSIPATING SYSTEM OF PERSONAL COMPUTER

(76) Inventor: Tong-Wen Shieh, 235 Chung-Ho Box 8-24, Taipei (TW)

( * ) Notice: Subject to any disclaimer, the term of this patent is extended or adjusted under 35 U.S.C. 154(b) by 255 days.

(21) Appl. No.: 10/764,871

(22) Filed: Jan. 27, 2004

(65) Prior Publication Data

US 2005/0162828 A1    Jul. 28, 2005

(51) Int. Cl.
*H05K 7/20* (2006.01)
*H05K 5/00* (2006.01)
*A47F 3/04* (2006.01)

(52) U.S. Cl. ............ 361/695; 361/687; 361/692; 454/184; 312/236; 174/16.1

(58) Field of Classification Search ........... 361/695, 361/724, 687
See application file for complete search history.

(56) References Cited

U.S. PATENT DOCUMENTS

| | | | |
|---|---|---|---|
| 5,596,483 A * | 1/1997 | Wyler | 361/683 |
| 6,122,168 A * | 9/2000 | Cheng | 361/695 |
| 6,215,659 B1 * | 4/2001 | Chen | 361/695 |
| 6,247,767 B1 * | 6/2001 | Liu et al. | 312/223.2 |
| 6,735,078 B1 * | 5/2004 | Tsai | 361/695 |
| 2003/0043548 A1 * | 3/2003 | Cheng | 361/720 |
| 2004/0027803 A1 * | 2/2004 | Tsai | 361/695 |
| 2004/0066622 A1 * | 4/2004 | Wang | 361/695 |
| 2004/0257764 A1 * | 12/2004 | Jang | 361/687 |
| 2005/0030711 A1 * | 2/2005 | Tsai | 361/687 |
| 2006/0019596 A1 * | 1/2006 | Su | 454/184 |

* cited by examiner

*Primary Examiner*—Lynn Feild
*Assistant Examiner*—Zachary Pape

(57) ABSTRACT

A heat dissipating system of a personal computer has a heat dissipating unit; the heat dissipating unit including a power supply; the power supply including a housing and a cover; a circuit and a double suction turbine fan being placed in a space formed by the housing and cover; the double suction turbine fan having a casing and a set of blades; an upper and lower surface of the double suction turbine fan having respective air inlets; one lateral side of the double suction turbine fan having an air outlet; one side of the casing of the power supply having air outlets, receptacles, and a power switch; another side of the casing of the power supply having a plurality of holes arranged like a net; a lower side of the cover having a round hole corresponding to the air inlet.

1 Claim, 9 Drawing Sheets

HEAT DISSIPATING SYSTEM OF PERSONAL COMPUTER

FIELD OF THE INVENTION

The present invention relates to heat dissipation, and particular to a heat dissipating system of a personal computer using a double suction turbine fan which has a high efficiency with a low cost.

BACKGROUND OF THE INVENTION

With the advance of integrated circuit (IC), a CPU is made more and more compact and has a higher speed than old ones. Thereby, a great deal of heat is generated. However in current trend, it is desired that the electronic devices have compact size, that is, they are smaller, and more and more peripherals are added to the computer, such as CD drive, hard disk drive, etc., and thus, it is required that the heat dissipating devices of those devices are compact with a powerful heat dissipating ability.

In the prior art power supply, the fan is vertical arranged in the casing of a power supply so that the height of the power supply can not be reduced. Since the fan is vertically arranged, the shaft for rotating the fan must support the weight of the fan. Thereby, the wearing between the shaft and the bearing is dramatic and thus, the lifetime is reduced. Furthermore, the blades of the fan is tightly adhered to the via holes for dissipating heat. The noise is large.

To improve above said defect, a large fan is added to the casing of the computer mainframe so as to have two heat dissipating effect by the fans in and out of the casing. However, since work is easy, but another fan is necessary so that the cost is high.

SUMMARY OF THE INVENTION

Accordingly, the primary object of the present invention is to provide a heat dissipating system of a personal computer having a heat dissipating unit; the heat dissipating unit including a power supply; the power supply including a housing and a cover; a circuit and a double suction turbine fan being placed in a space formed by the housing and cover; the double suction turbine fan having a casing and a set of blades; an upper and lower surface of the double suction turbine fan having respective air inlets; one lateral side of the double suction turbine fan having an air outlet; one side of the casing of the power supply having air outlets, receptacles, and power switch; another side of the casing of the power supply having a plurality of holes arranged like a net; a lower side of the cover having a round hole corresponding to the air inlet; wherein the double suction turbine fan dissipates heat generated from the power supply and the personal computer so as to dissipate heat rapidly.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
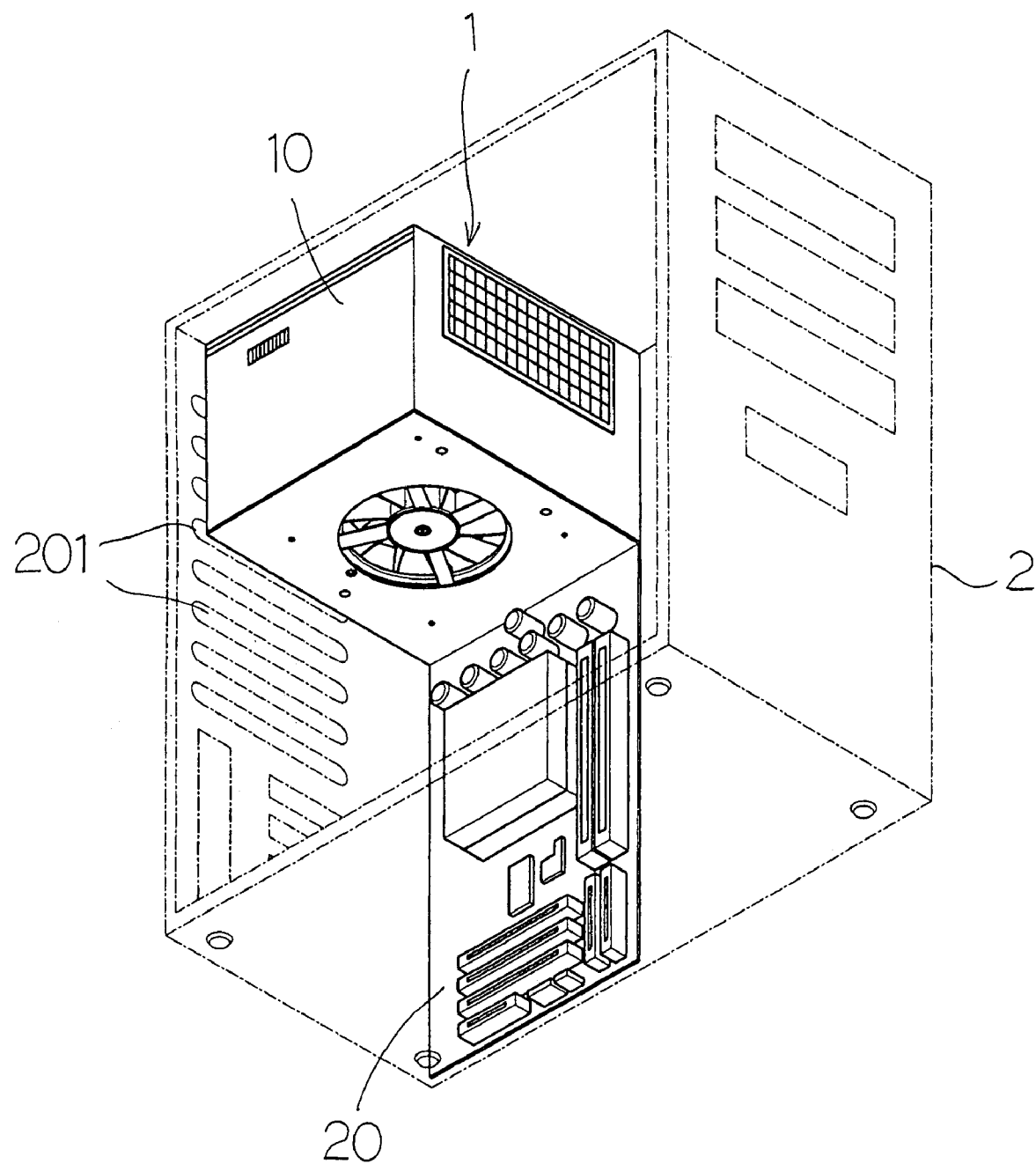
FIG. 1 is a perspective view of the preferred embodiment of the present invention.

With reference to FIG. 1, the heat dissipating system of a personal computer is illustrated, wherein the power supply 10 of the heat dissipating system 1 of the present invention is assembled to a mainframe casing 2.

Figure 2:
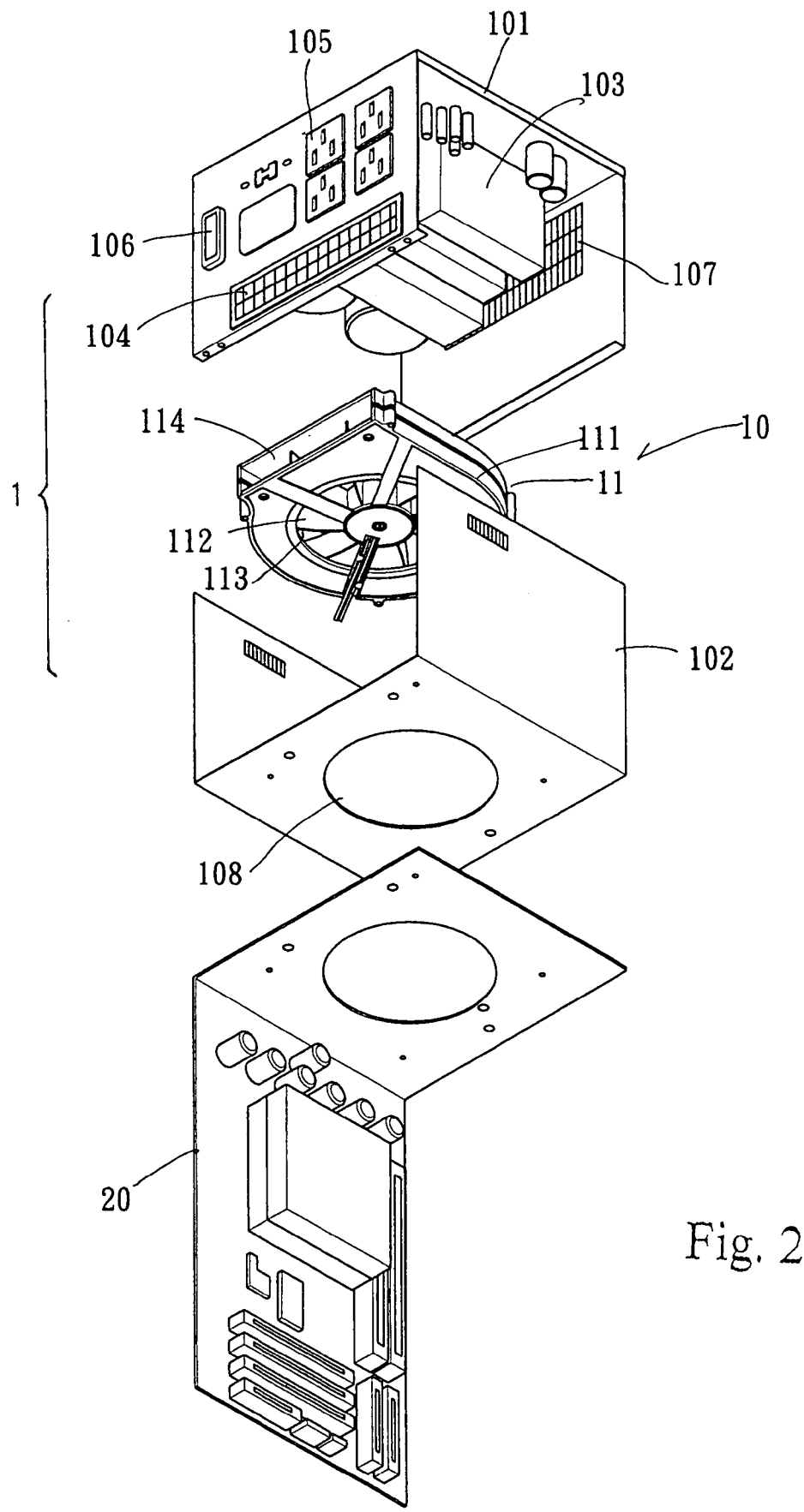
FIG. 2 is an exploded view of the power supply and mother board according to the preferred embodiment of the present invention.
Figure 3:
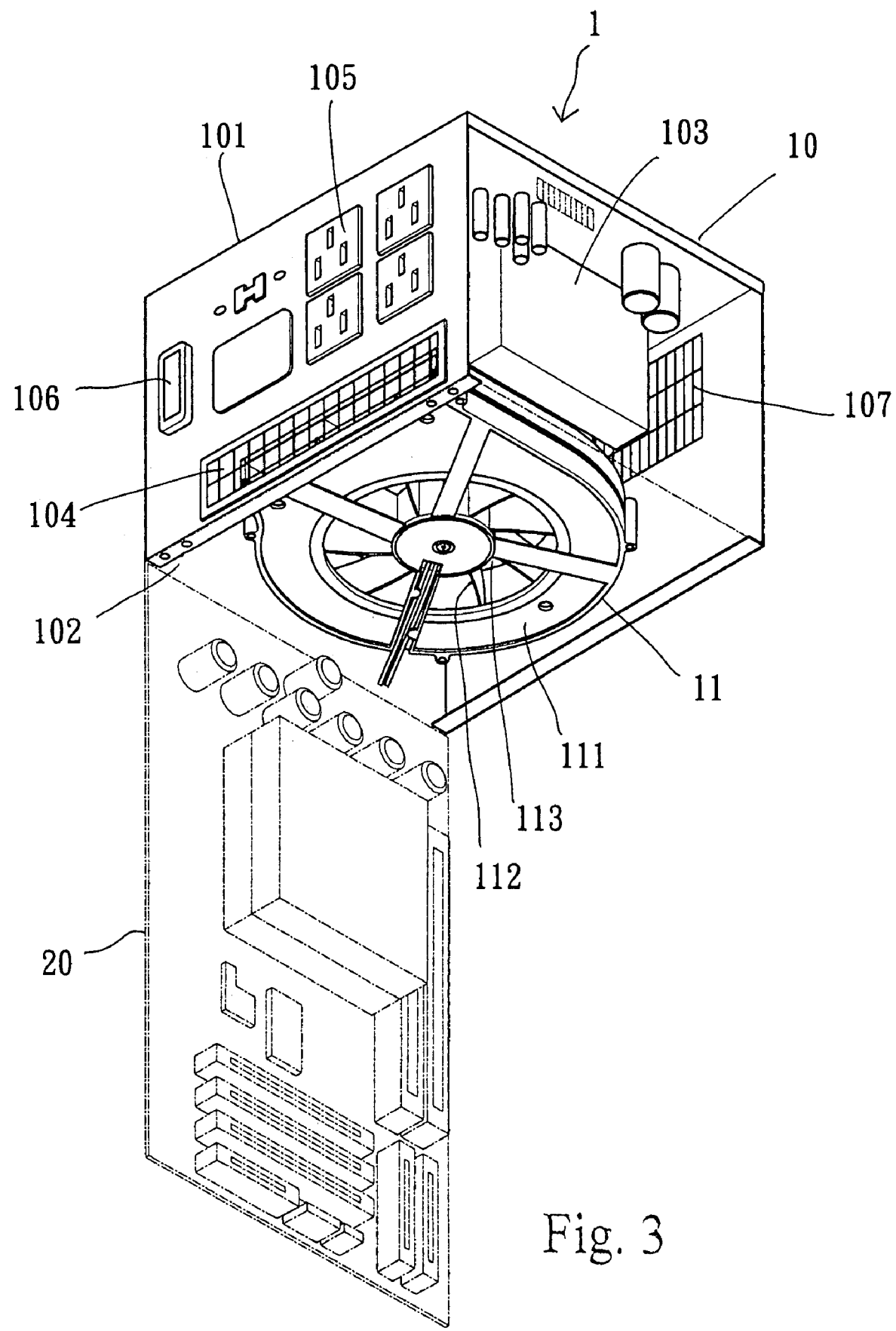
FIG. 3 is an assembled perspective view of the power supply of the preferred embodiment of the present invention.
Figure 4:
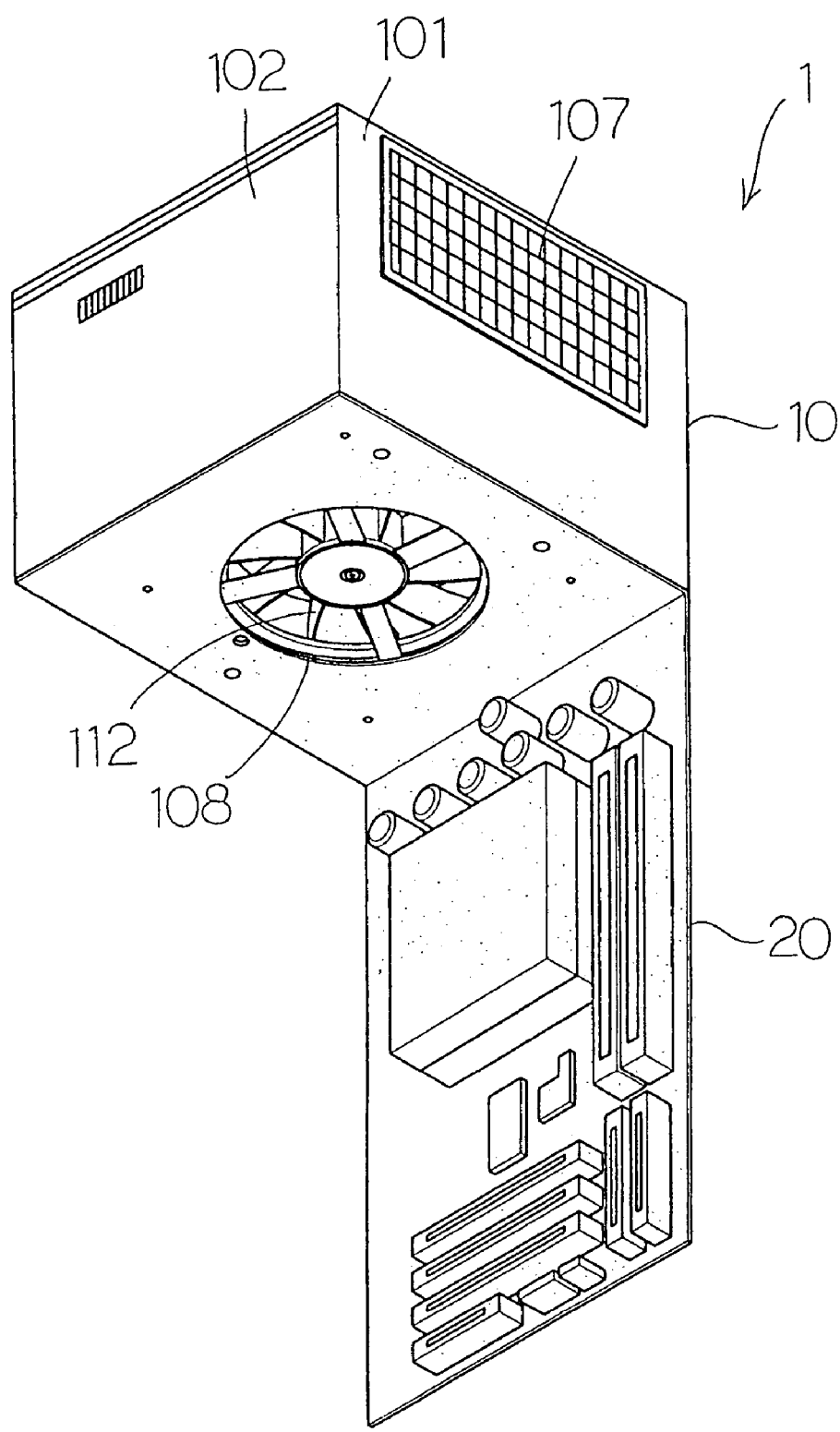
FIG. 4 is a perspective view about the combination of the power supply and mother board of the present invention.
Figure 5:
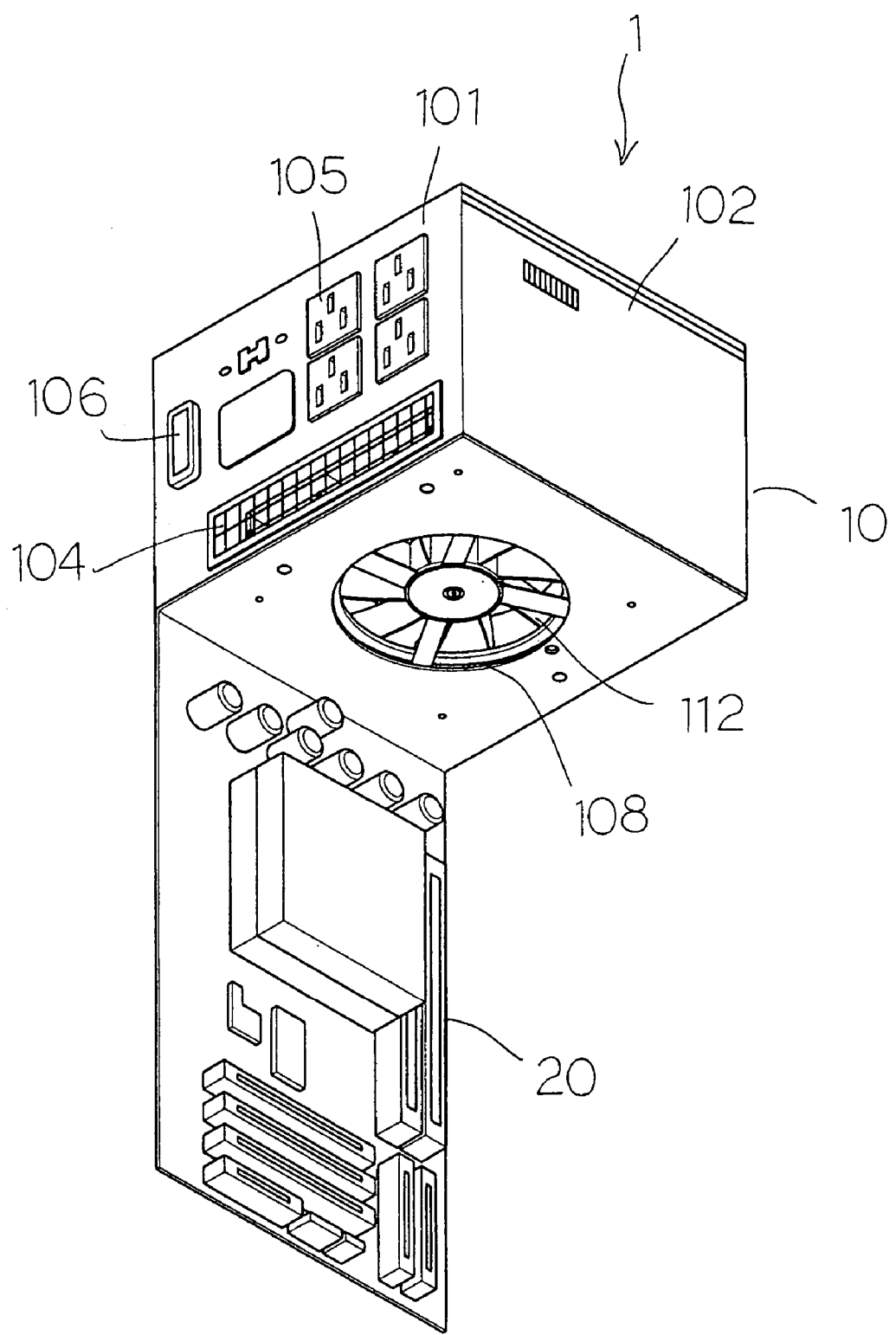
FIG. 5 is another perspective view about the power supply and mother board of the preferred embodiment of the present invention.

Referring to FIGS. 2 and 3, the heat dissipating system is installed with a power supply 10 with a double suction turbine fan 11 therein. The power supply 10 includes a housing 101 and a cover 102 coupled to the housing 101. A circuit 103 and related electronic elements (such as capacitors, transformers, heat dissipating sheets, inductors, etc.) are installed in the housing 101. One side of the housing 101 is installed with an air outlet 104, receptacles 105, a power switch 106, etc. Another side of the housing 101 is installed with a plurality of banks of holes 107. A lower side of the cover 102 is formed with a round hole 108. A double suction turbine fan 11 is installed within the cover 102, which can dissipate heat effectively. An upper surface and a lower surface of the casing 111 are installed with respective air inlets 113.

Figure 8:
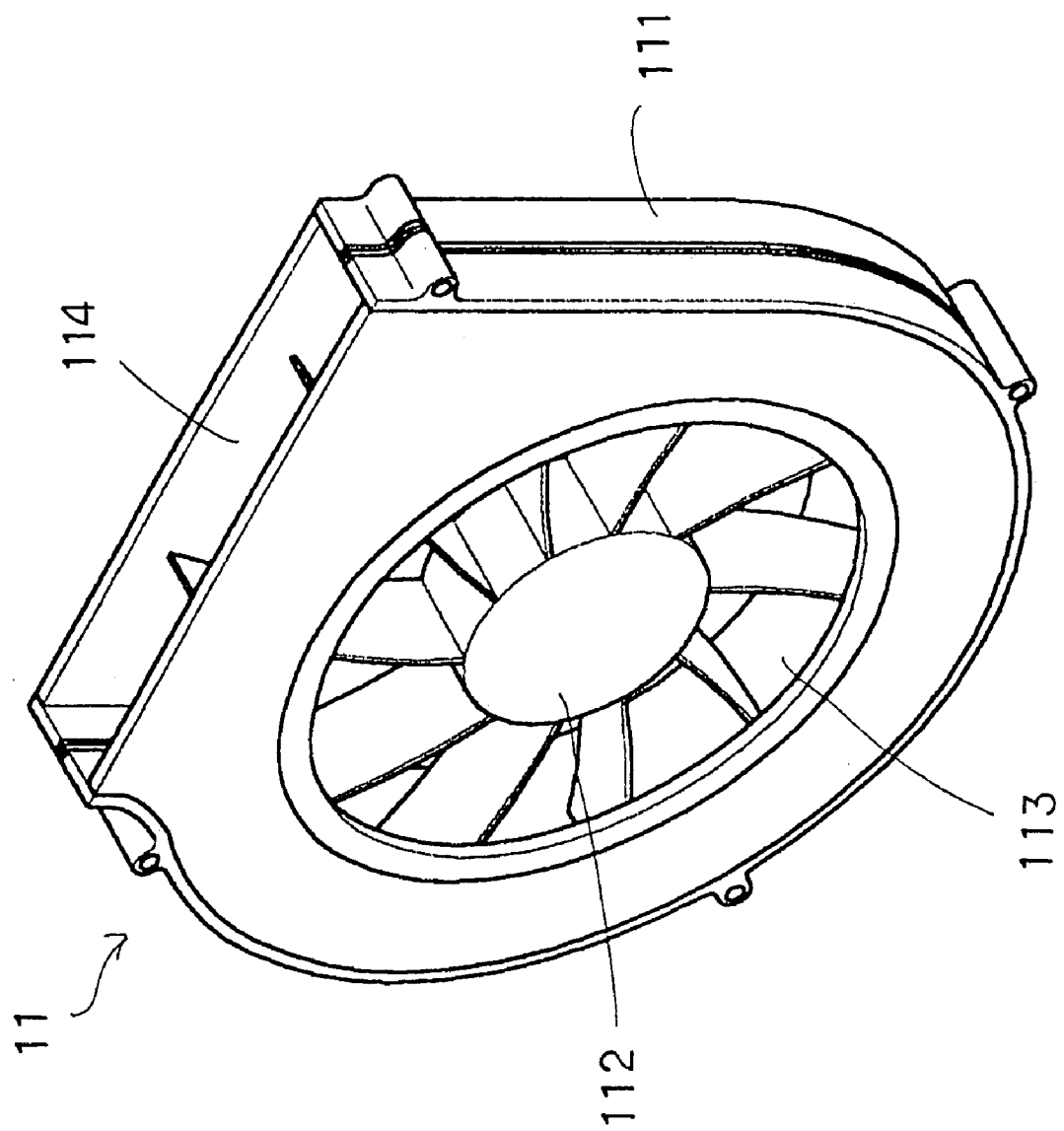
FIGS. 8 and 9 are front view and back side view of the double suction turbine fan according to the present invention.
Figure 9:
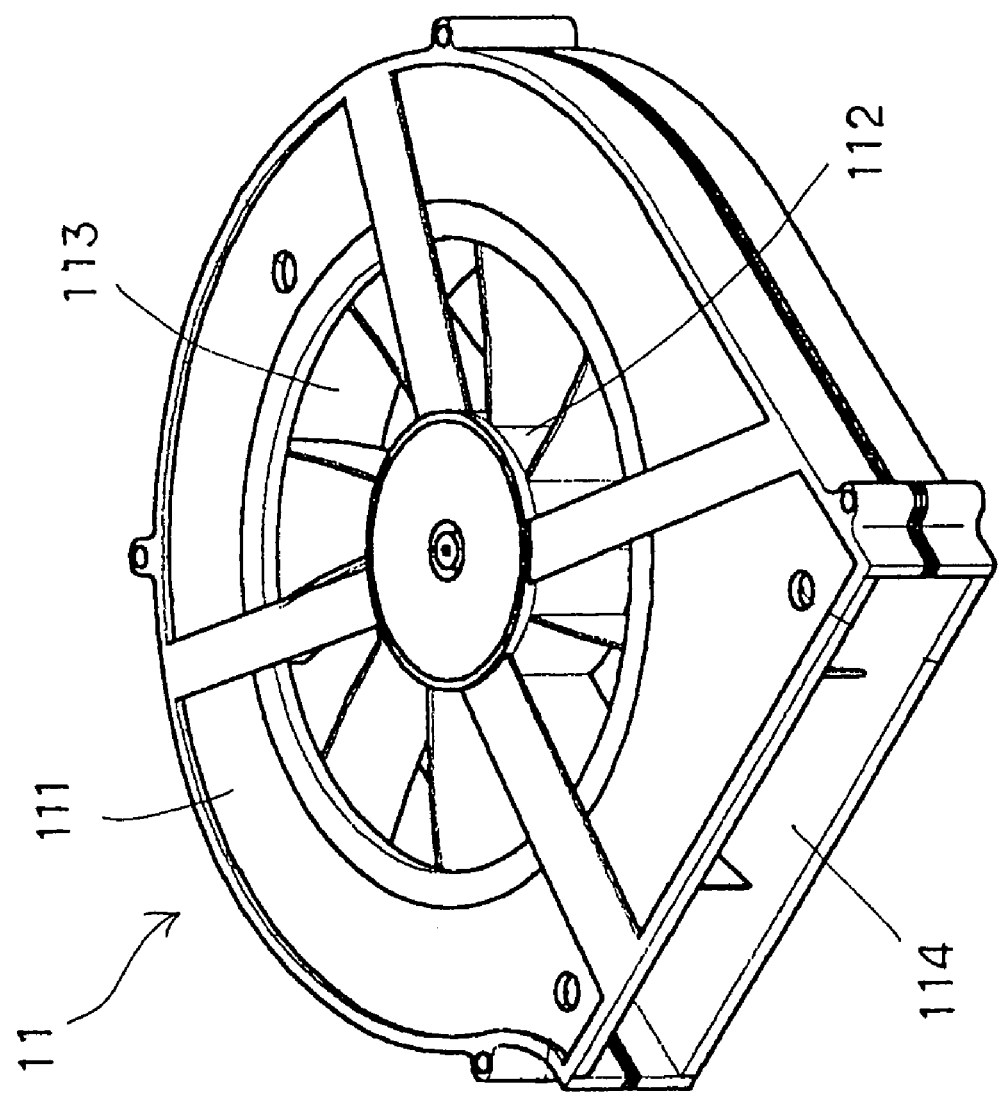

The structure of the double suction turbine fan 1 is integrally. assembled to one side of the motherboard 20 so as to be installed to the mainframe casing 2 of a computer. FIGS. 8 and 9 are a front view and a back side view of the double suction turbine fan according to the present invention.

Figure 6:
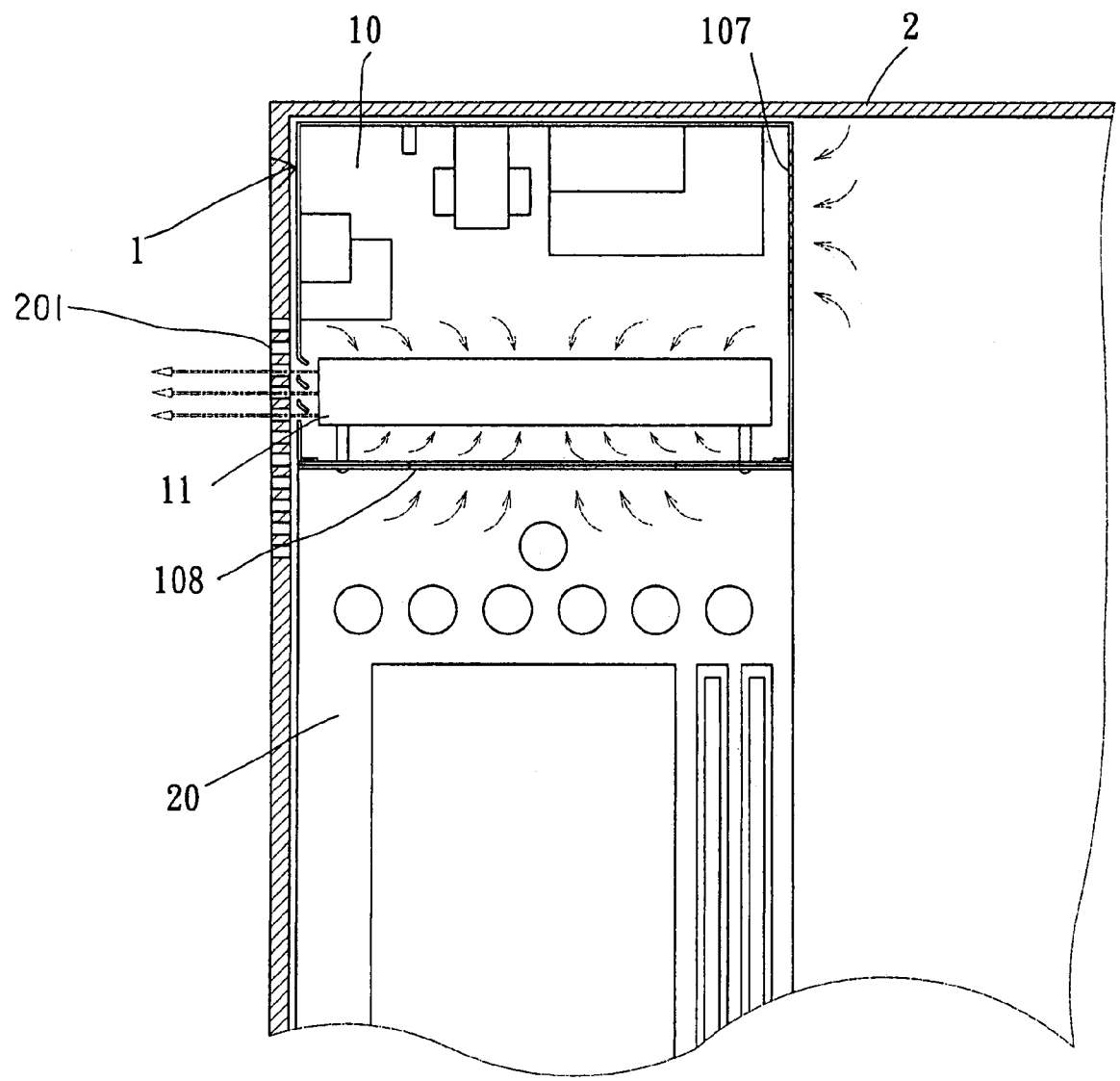
FIG. 6 is a schematic view about the schematic view of the preferred embodiment of the present invention.
Figure 7:
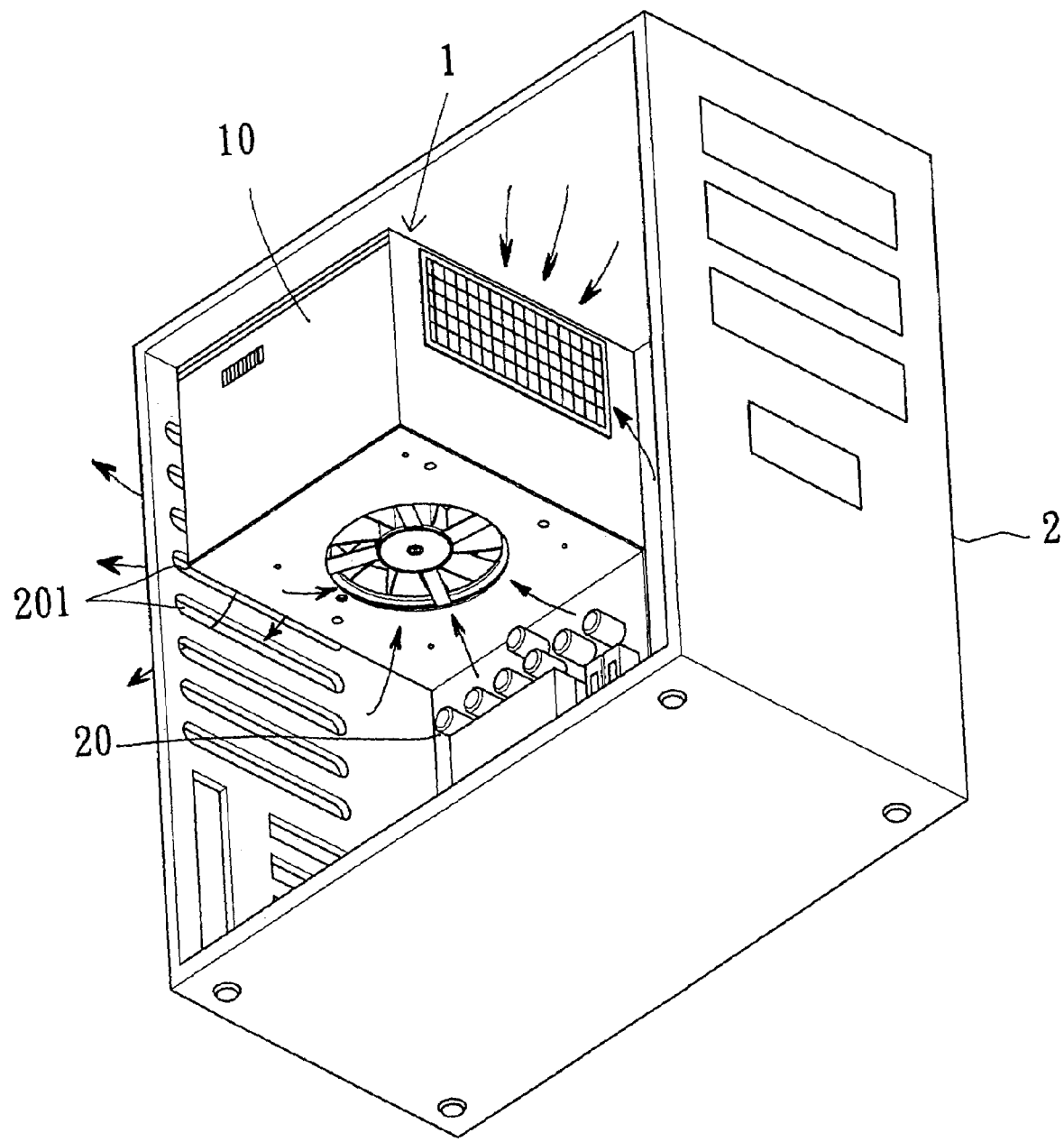
FIG. 7 is a schematic perspective view of the heat dissipating effect of, the preferred embodiment of the present invention.

With reference to FIGS. 6 and 7, the power supply 10 and the motherboard 20 are placed in the mainframe casing 2. The air outlet 104 of the power supply 10 faces to the heat dissipating holes 201 of the mainframe casing 2. Thereby, when the devices, such as the power supply 10, motherboard 20, and CPU of the computer mainframe are actuated so that heat is generated in the interior of the computer mainframe, the blades 112 of the double suction turbine fan 11 actuated with the power supply 10 rotate to generate suction force bi-directionally and thus to receive the heat energy generated from the circuit 103 and receive the heat energy from the hard disk, CD driver, and CD recorder. Air is sucked from the round hole 108 and the holes 107. The air is guided to the vents 114. Since the vents 114 are tightly adjacent to the air outlet 104 at one side of the housing 101 and the air outlet 104 faces to the heat dissipating holes 201 of the mainframe casing 2.

It is known from above discussion that the double suction turbine fan 11 is installed to the heat dissipating system of a personal computer, which can absorb hot air in the power supply and heat can be dissipated rapidly. Besides, the heat generated from the mother board, CPU, hard disk drive, CD drive, burner, etc., can be dissipated. Not only release heat from heat dissipater, but also reduce the environmental temperature of a casing of a computer.

The double suction turbine fan has a heat dissipation capacity with a 30% over the prior art. Moreover, for the same wind amount, the double suction turbine fan of the present invention only needs a rotation speed only 70% of the prior art one. Thereby, power is saved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A heat dissipating System of a personal computer having a heat dissipating unit; the heat dissipating unit including a power supply; the power supply including a housing and a cover; a circuit and a double suction turbine fan being placed in a space formed by the housing and the cover; the double suction turbine fan having a casing and a set of blades; an upper and lower surface of the double suction turbine fan having respective air inlets; one lateral side of the double suction turbine fan having an air vent; the housing having three sides which are arranged to have an approximate U shape; one side of the housing of the power supply having air outlets which are arranged as a net, receptacles, and a power switch; another side of the housing having a plurality of holes arranged as a net; the circuit being arranged at a lower side of the housing; the air inlet at the upper surface of the double suction turbine fan facing to the circuit; and the air vent facing to the air outlet; the cover having three sides which are arranged to have an approximate U shape; a lower side of the cover having a round hole corresponding to the air inlet of the double suction turbine fan; and the air inlet at the lower surface of the double suction turbine fan facing to the round hole of the cover; wherein in assembly, the round hole of the cover is located to be near an opening of a motherboard so as to allow suction of heat from the motherboard and then the double suction turbine fan dissipates heat generated from the motherboard so as to dissipate heat rapidly.

* * * * *